United States Patent [19]
Cassel

[11] Patent Number: 5,310,158
[45] Date of Patent: May 10, 1994

[54] HANGER CLAMP ASSEMBLY

[75] Inventor: Scott T. Cassel, Birmingham, Mich.

[73] Assignee: BKS Company, Birmingham, Mich.

[21] Appl. No.: 556,314

[22] Filed: Jul. 22, 1990

[51] Int. Cl.[5] ............................................. F16L 3/00
[52] U.S. Cl. ...................................... 248/74.3; 248/62
[58] Field of Search ............... 248/74.3, 62, 214, 231, 248/316.1, 74.1, 317; 24/20 LS, 68 BT, 135 K; 280/689

[56] References Cited

U.S. PATENT DOCUMENTS

| | | | |
|---|---|---|---|
| 1,882,555 | 10/1932 | Gray | 248/74.3 |
| 2,329,894 | 9/1943 | Hall | 248/74.3 |
| 2,842,218 | 7/1958 | Bradbury | 248/62 X |
| 2,869,201 | 1/1959 | Wolff | 248/214 |
| 2,984,442 | 5/1961 | Lawson | 248/74.3 |
| 3,567,165 | 3/1971 | White | 248/74.3 X |
| 3,602,960 | 9/1971 | Urbigkeit | 248/74.3 |
| 4,312,526 | 1/1982 | Cassel . | |
| 4,459,735 | 7/1984 | Sawdon . | |
| 4,521,940 | 6/1985 | Oetiker | 24/20 LS X |
| 4,623,164 | 11/1986 | Cassel | 24/20 LS X |
| 4,714,218 | 12/1987 | Hungerford, Jr. | 248/62 |
| 4,757,609 | 7/1988 | Sawdon . | |

FOREIGN PATENT DOCUMENTS 1284575 6/1991 Canada ............................... 248/74.1

OTHER PUBLICATIONS

Vertical Muffler Bracket Assembly Drawing 1.
Vertical Muffler Bracket Assembly Drawing 2.

*Primary Examiner*—Karen J. Chotkowski
*Attorney, Agent, or Firm*—Reising, Ethington, Barnard, Perry & Milton

[57] ABSTRACT

A hanger clamp assembly is provided for supporting a muffler body directly from the undercarriage of a vehicle. A band clamp is adapted to encircle the muffler body and a mounting arm of a hanger bracket is disposed between a support plate on the band clamp and the muffler. The band clamp has a force applying mechanism to tighten the sleeve of the band clamp around the muffler and press the support plate against the surface of the muffler. The support plate is substantially longer in the circumferential direction than the mounting arm of the support bracket and thereby provides an extended moment arm to resist rotative motion of the muffler about its longitudinal axis.

12 Claims, 2 Drawing Sheets

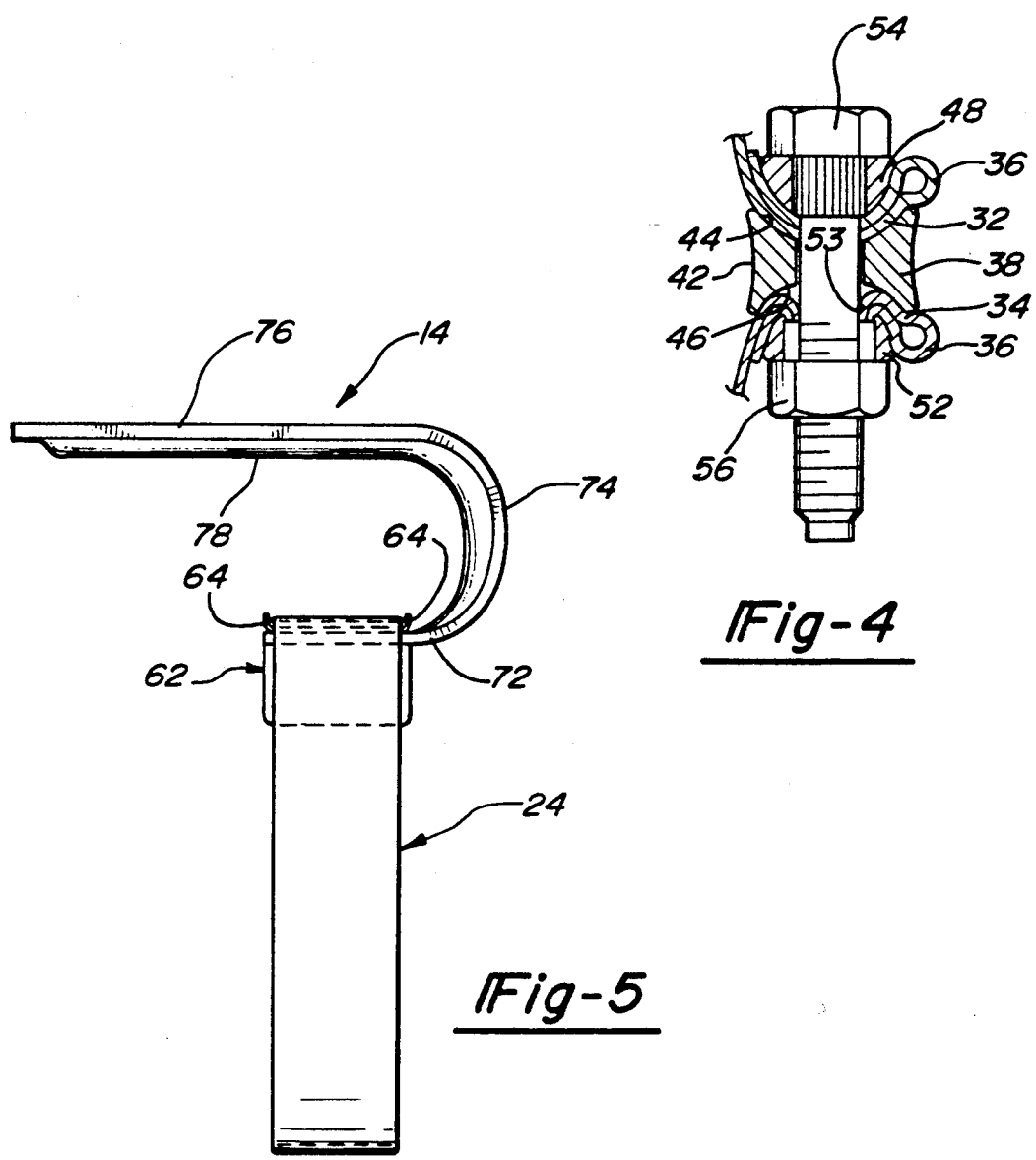
Fig-4
Fig-5
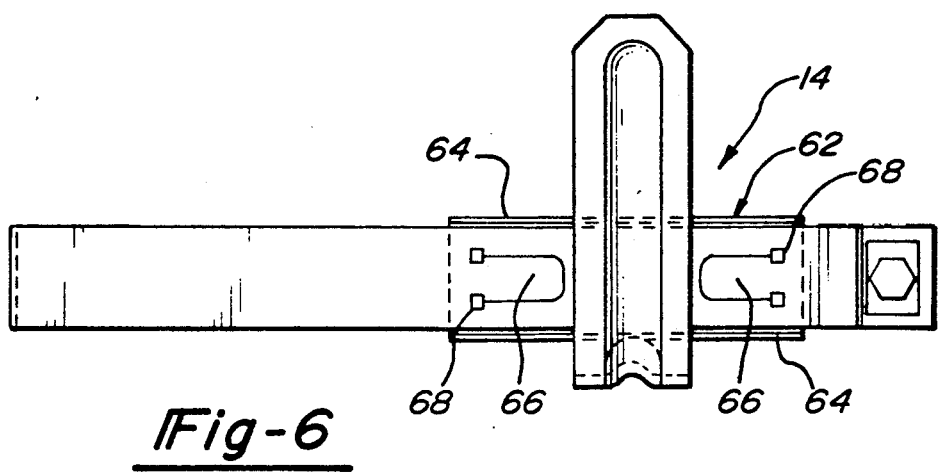
Fig-6

HANGER CLAMP ASSEMBLY

FIELD OF THE INVENTION

This invention relates to automotive vehicles; more particularly, it relates to a hanger clamp assembly for supporting a muffler from the undercarriage of a vehicle.

BACKGROUND OF THE INVENTION

In certain automotive vehicle designs, it is desirable to support the muffler body directly from the undercarriage of the vehicle rather than supporting it indirectly by hangers on stub pipes at the ends of the muffler. It has been previously proposed to support a muffler body from the undercarriage by a band clamp around the muffler body. In this prior proposal, the hanger clamp assembly is prone to failure at two different critical regions in the band clamp. First, this prior art band clamp is tightened around the muffler body by a clamping bolt which extends between the free ends of the clamp sleeve, the free ends being turned outwardly to form opposed flanges. This arrangement results in unsupported bending moments at the juncture of the flange with the sleeve so that the tensile stresses and bending stresses in that region are very high compared with the tensile stresses achieved in the sleeve surrounding the muffler. A second area of high bending stresses occur in the sleeve portion of the prior art clamp, adjacent its engagement with the hanger bracket which is supported from the undercarriage of the vehicle.

Band clamps are already known in the prior art which utilize a sleeve portion adapted to conform to the body being clamped and a channel portion with first and second sidewalls which are extensions of the sleeve portion and extend in a direction perpendicular to the adjacent sleeve portion. A force applying means includes a spline between the sidewalls and a bar outside each sidewall with a bolt for drawing the sidewalls into engagement with the spline to tighten the sleeve portion around the body. A band clamp of this type is disclosed in the Cassel U.S. Pat. No. 4,312,526 granted Jan. 26, 1982 and also in Cassel et al U.S. Pat. No. 4,623,164 granted Nov. 18, 1986.

SUMMARY OF THE INVENTION

In accordance with this invention, a hanger clamp assembly is provided for hanging a muffler from an undercarriage member of a vehicle and which resists rotation of the muffler about its longitudinal axis due to torques induced by vehicle motion. The hanger clamp assembly is economical to manufacture, simple to install and exhibits a high degree of durability and reliability. This is accomplished by a band clamp and a hanger bracket which coact to support the muffler and stabilize it against rotational motion. The band clamp has a sleeve portion conforming to the cross-section of the muffler and a channel portion with a pair of opposed sidewalls extending perpendicularly from the sleeve portion and drawn together against a concave spline by a bolt which acting through a pair of force bars. This draws the sleeve portion tightly against the muffler with intimate contact substantially around the periphery of the muffler. The hanger bracket has a mounting arm which extends between the muffler and the sleeve portion and which is adapted to be secured to an undercarriage member of the vehicle for hanging the muffler therefrom. A support plate is disposed between the arm and the inner surface of the sleeve portion and extends circumferentially of the sleeve portion and presses the arm against the surface of the muffler and engages the muffler circumferentially of the arm to provide an extended moment arm to resist rotative motion of the muffler about its axis.

Further, in accordance with the invention, the support plate has a width substantially equal to that of the sleeve portion and includes a unitary out-turned flange on each edge for stiffening the plate. Preferably, the sleeve portion is disposed between the flanges and is secured to the plate by a plurality of mechanical interlock joints.

Further, in accordance with the invention, the support plate includes a pair of spaced unitary inwardly extending protuberances adjacent each edge of the mounting arm and seated upon the muffler when the force applying means is tightened.

Further, in accordance with the invention, the hanger bracket includes a hanger arm extending from the mounting arm and is unitary therewith. A stiffening rib is provided in the hanger arm and extends into the juncture of the hanger arm with the mounting arm. The mounting arm is flat throughout the extent of its engagement with the support plate.

A complete understanding of the invention will be obtained from the detailed description that follows taken with the accompanying drawings.

DESCRIPTION OF THE DRAWINGS

FIG. 4 shows a detail of the force applying means of the clamp assembly;

FIG. 5 is an elevation view of the hanger clamp assembly; and

FIG. 6 is a top plan view of the hanger clamp assembly.

BEST MODE FOR CARRYING OUT THE INVENTION

Figure 1:
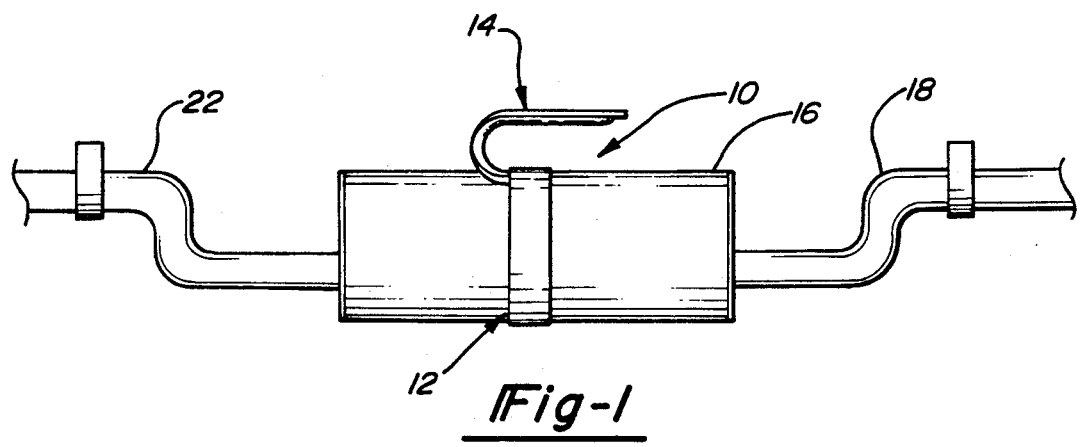
FIG. 1 shows an elevation view of the hanger clamp assembly of this invention installed on a vehicle muffler.

Referring now to the drawings, there is shown an illustrative embodiment of the invention in a hanger clamp assembly especially adapted for supporting the body of a vehicle muffler directly from the undercarriage of a vehicle. It will be appreciated, as the description proceeds, that the invention may be embodied in different forms and may be useful in other applications.

As shown in FIG. 1, the hanger clamp assembly 10 of this invention comprises, in general, a band clamp 12 and a hanger bracket 14. As illustrated, the hanger clamp assembly 10 is especially adapted to support a vehicle muffler 16 which is connected with an exhaust pipe 18 and a tail pipe 22 of a vehicle exhaust system. The hanger bracket 14 is adapted to be connected with an undercarriage member (not shown) of the vehicle.

Figure 2:
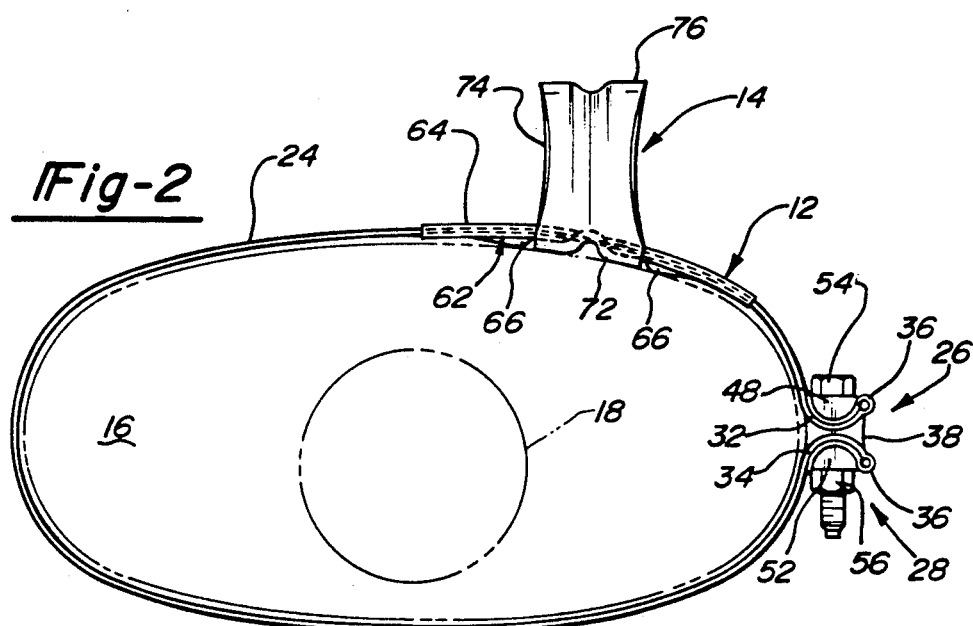
FIG. 2 shows an end view of the hanger clamp assembly in its tightened condition.
Figure 3:
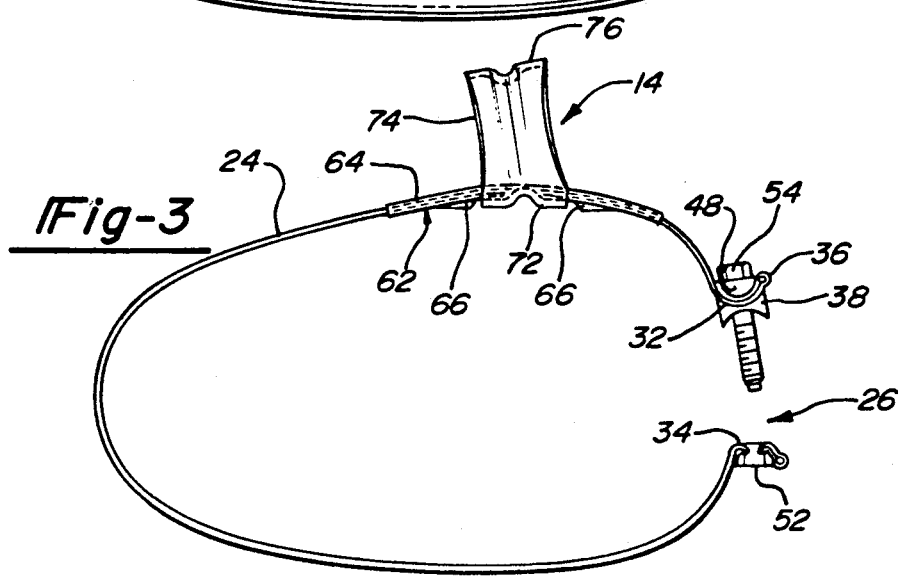
FIG. 3 shows the hanger clamp assembly in its open condition prior to tightening.

The band clamp 12 of the hanger clamp assembly is shown in greater detail in FIGS. 2 and 3. The band clamp 12 comprises a flat band of sheet metal which is formed with a sleeve portion 24 and a channel portion 26. As shown in FIG. 2, the band clamp 12 is in its tightened condition around the body of the muffler 16 and the sleeve portion 24 is in intimate engagement with the outer surface of the roundish cross-section of the muffler throughout a substantial part of the circumference of the muffler. The tightening of the sleeve portion 24 around the muffler is accomplished by a force applying means 28 which coacts with the channel portion 26 of the band clamp. The channel portion 26 comprises a pair of sidewalls 32 and 34 extending outwardly from the roundish sector of the sleeve portion 24. The sidewalls are preferably formed as a double layer of the sheet metal of the sleeve portion. In sidewall 32, the double layer comprises an inner layer which is a continuation of the sleeve portion and an outer layer which is formed by folding the sheet metal of the sleeve portion back on itself around a loop or bight 36. The bight 36 constitutes a retaining member and has a greater thickness than that of the sidewall 32. For greater strength in the sidewall, the outer and inner layers thereof may be connected together as by a weldment (not shown) in the form of plural spot welds spaced along the length of the sidewall at the free end of the outer layer. The sidewall 34 is of the same construction as that of sidewall 32 just described.

The force applying means 28 is adapted to tighten the sleeve portion 24 around the muffler 16 and is connected with the channel portion 26. The force applying means, as shown in detail in FIG. 4 comprises a reaction member or spline 38 which is disposed within the channel portion 26 and which has an inner surface 42 which is adapted to seat upon the outer surface of the muffler 16. The spline 38 is provided with a pair of oppositely facing concave surfaces 44 and 46 which are adapted to be engaged by and provide seating surfaces for the respective sidewalls. The force applying means also comprises a pair of spacers or force bars 48 and 52 which are disposed outside the respective sidewalls 32 and 34 opposite the concave surfaces in the spline 38. A bolt 54 extends through aligned openings in the force bars 48 and 52, sidewalls 32 and 34 and the spline 38. The head of the bolt 54 is seated against the bar 48 and a nut is threaded onto the bolt and is seated against the bar 52.

The band clamp 12 includes a support plate 62 which serves as an interface between the sleeve portion 24 and the hanger clamp 14. The support plate 62 is best shown in FIGS. 2, 5 and 6. It comprises an elongated plate-like member which is formed of stamped sheet metal. It is provided with out-turned flanges 64 unitary with the plate and extending along lengthwise edges of the plate. The plate has a width between the out-turned flanges which is slightly greater than the width of the sleeve portion 24. The plate has a length which is substantially greater than the width of the hanger bracket mounting arm 72 (which will be described below), preferably about three times the width of the arm 72. The flanges 64 constitute stiffening ribs for the support plate 62 and serve to enhance its bending strength in its lengthwise direction. The support plate 62 is pre-formed so that it is somewhat arcuate in its longitudinal cross-section to substantially conform to that portion of the muffler and hanger bracket which it engages. The support plate 62 is also provided with a pair of spaced inwardly extending round-shaped protuberances 66. The protuberances 66 are spaced apart slightly greater than the width of the mounting arm 72 of hanger bracket 14 and are adapted to be seated against the outer surface of the muffler. The support plate is secured to the sleeve portion 24 to facilitate installation of the hanger clamp assembly. The securement between the support plate 62 and the sleeve portion 24 is preferably provided by mechanical interlocks 68 either of the type wherein the two parts are jointly lanced at discrete locations or of the type wherein the two parts are jointly drawn and upset in a cage configuration. Alternatively the securement may comprise spot welds. These types of mechanical interlock are disclosed, respectively, in Sawdon U.S. Pat. No. 4,459,735 granted Jul. 17, 1984 and in Sawdon U.S. Pat. No. 4,757,609 granted Jul. 19, 1988.

The hanger bracket 14 is adapted to support the hanger clamp assembly from the undercarriage of the vehicle. The hanger bracket 14 is generally C-shaped and is formed as a sheet metal stamping. The hanger bracket 14 comprises the mounting arm 72 which is disposed between the support plate 62 and the muffler 16. A hanger arm 74, unitary with the mounting arm, has a C-shaped profile and is designed to reduce stress concentration and provide optimum fatigue life. A support arm 76 extends from the hanger arm 74 and is adapted for securement to an undercarriage member of the vehicle (not shown). The bracket is provided with a unitary stiffening rib 78 extending longitudinally throughout the support arm 76, the hanger arm 74 and through the juncture of arm 74 with mounting arm 72. The mounting arm 72 is substantially flat from its free end up to the point of juncture with hanger arm 74, i.e. at the point of the bend which joins the two arms. This construction provides the required stiffness for the hanger bracket 14 and allows an interface of large surface extent between the mounting arm 72 and the support plate 62.

The installation of the hanger clamp assembly 10 is as follows. The support arm 76 of the hanger bracket 14 is secured to the undercarriage member of the vehicle at the desired location for the support of the muffler 16. The band clamp 12 is initially in its open condition as shown in FIG. 3, i.e. the threaded shank of the bolt 54 is removed from the sidewall 34 and force bar 52. The bar 52 may be held captive by an extrusion 53 of the sidewall 34 into the hole in the bar. The bolt 54, sidewall 32 and bar 48 are held captive as a subassembly by a force fit of the bolt shank into the hole in the spline 38, for ease of installation. In this condition, the sleeve portion 24 of the band clamp 12 can be sprung open sufficiently to allow the muffler 16 to be inserted laterally into the sleeve portion 24. With the muffler in position, the bolt 54 is inserted through the openings in the sidewall 34 and the force bar 52 and the nut 56 is tightened onto the bolt 54. As this tightening proceeds, the sidewalls 32 and 34 are drawn inwardly by the bars 48 and 52 into engagement with the spline 38. The bights 36 are drawn into engagement with the respective bars 48 and 52 and the spline 38. Thus the bights are seated or trapped between the respective bar and spline. The sleeve 24 in its unstressed condition is of such size relative to the muffler 16 when the sidewalls 32 and 34 are drawn into seating engagement with the spline 38, the shape of the muffler yields somewhat or the sleeve portion 24 is stretched, or both. In this tightening, the tensile force in the sidewalls 32 and 34 is transmitted to the sleeve portion 24 without undue stress concentration. As the sleeve portion 24 is tightened it is drawn into intimate engagement with substantially the entire periphery of the muffler. At the same time, the support plate 62 is drawn tightly against the mounting arm 72 which is pressed tightly against the outer surface of muffler 16 and held by frictional engagement. In this tightened condition, the support plate 62 engages the muffler over a substantial circumferential extent and, due to its stiffness, it resists rotative motion of the muffler about its longitudinal axis. This resistance is enhanced by the extended moment arm of the support plate 62 which, by reason of the flanges 64, effectively extends from one end of the support plate 62 to the other. The protuberances 66 provide continuity of engagement of the support plate 62 up to close proximity to the mounting arm 72 without abrupt change of profile at the junction with the arm which might damage the muffler or loosen the clamp 12. Thus, the hanger clamp assembly 10 of this invention provides a stable support for the muffler and resists rotation of the muffler about its longitudinal axis due to torques induced by vehicle motion without development of undue stress concentration in the band clamp.

Although the description of this invention has been given with reference to a particular embodiment, it is not to be construed in the limiting sense. Many variations and modifications will now occur to those skilled in the art. For a definition of the invention reference is made to the appended claims.

What is claimed is:

1. In combination with a vehicle muffler having a roundish cross-section, a hanger clamp assembly for hanging said muffler from an undercarriage member of a vehicle, said assembly comprising:
   a band clamp having a sleeve portion and a channel portion,
   said sleeve portion being adapted to be conformed to said roundish cross-section of said muffler throughout a substantial part of the circumference of said muffler,
   said channel portion comprising first and second sidewalls extending substantially perpendicularly outward from said sleeve portion and terminating in free ends separated from each other,
   a spline disposed between the sidewalls and having a pair of surfaces which are respectively opposite said pair of sidewalls, at least one of said surfaces of said spline being concave, a pair of bars, one bar being disposed against one sidewall opposite said concave surface of the spline and the other bar being disposed against the other sidewall opposite the other surface of the spline,
   a hanger bracket adapted for attachment to said member and having a mounting arm extending transversely of said sleeve portion and disposed between the outer surface of said muffler and the inner surface of said sleeve portion,
   a support plate disposed between the outer surface of said arm and said inner surface of said sleeve portion, said plate extending in the circumferential direction of said sleeve portion with a length substantially greater that the width of said arm,
   and a force applying means including at least one bolt extending through the bars, sidewalls and spline and being adapted to draw the bars together and force the sidewalls against the respective surfaces of the spline whereby the sleeve portion is drawn into intimate engagement with said muffler,
   and said support plate presses said arm against the surface of said muffler and engages said muffler circumferentially of said arm to thereby resist rotative motion of said muffler about its longitudinal axis.

2. The invention as defined in claim 1 wherein said support plate has a width substantially equal to the width of said sleeve portion and includes a unitary outturned flange on each edge for stiffening said plate.

3. The invention as defined in claim 2 wherein said sleeve portion is disposed between said flanges and is secured to said plate by a plurality of mechanical interlock joints.

4. The invention as defined in claim 1 wherein said plate includes a pair of longitudinally spaced unitary inwardly extending protuberances disposed adjacent each edge of said mounting arm and seated upon said muffler when said force applying means is tightened.

5. The invention as defined in claim 1 wherein said hanger bracket includes a hanger arm extending from said mounting arm and being unitary therewith, a unitary stiffening rib in said hanger arm and in the juncture of the hanger arm with the mounting arm, said mounting arm being flat throughout the extent of its engagement with said support plate.

6. A hanger clamp assembly for supporting a vehicle muffler form an undercarriage member of a vehicle, the hanger clamp assembly comprising:
   a band clamp having a sleeve portion and first and second end portions, said sleeve portion being generally conformable to the circumference of the muffler and said end portions being configured to be movable towards each other by a fastener to thereby tighten said band clamp about the muffler;
   a hanger bracket attachable to the undercarriage member and having a mounting arm configured to be able to extend transversely of said sleeve portion between the outer surface of the muffler and the inner surface of said sleeve portion when said band clamp and hanger bracket are assembled to support the muffler;
   a support plate having a length that is substantially greater than the width of said mounting arm, said support plate being configured such that, when said band clamp, hanger bracket, and support plate are assembled to support the muffler and said end portions are tightened together by the fastener, said support plate can be disposed between a section of said sleeve portion and said mounting arm in contact with said mounting arm and the muffler to thereby press said mounting arm against the surface of the muffler.

7. A hanger clamp assembly as defined in claim 6, further comprising a fastener, wherein said first and second end portions of said band clamp include first and second respective sidewalls, each of said sidewalls having an aperture therein, and wherein said fastener includes:
   a spline having an aperture therein and being disposed adjacent a first surface of said first sidewall;
   a spacer having an aperture therein and being disposed adjacent a second surface of said first sidewall opposite said spline; and
   a bolt extending through said apertures of said spacer, first sidewall, and spline;
   wherein said spline is fit onto said bolt such that said spacer and first sidewall are retained by said bolt and spline.

8. A hanger clamp assembly as defined in claim 7, wherein said fastener further comprises a second spacer having an aperture therein for receiving said bolt, and wherein said second sidewall has an extrusion extending into said aperture in said second spacer to thereby retain said second spacer to said second sidewall.

9. A hanger clamp assembly as defined in claim 6, wherein said support plate has a width greater than the width of said section of said sleeve portion and wherein said support plate includes a unitary, out-turned flange extending along each of its lengthwise edges, whereby said flanges define a channel within which said section of said sleeve portion can extend when said band clamp, hanger bracket, and support plate are assembled to support the muffler.

10. A hanger clamp as defined in claim 6, wherein said support plate extends arcuately along its length.

11. A hanger clamp as defined in claim 6, wherein said sleeve portion is secured to said plate by a plurality of mechanical interlock joints.

12. A hanger clamp as defined in claim 6, wherein said support plate includes a pair of longitudinally spaced, unitary, inwardly extending protuberances configures to be seated upon the surface of the muffler adjacent each edge of said mounting arm when said band clamp, hanger bracket, and support plate are assembled to support the muffler and said end portions are tightened together by the fastener.

* * * * *